E. P. BURRELL.
AUTOMATIC STOP MECHANISM FOR TURRET LATHES.
APPLICATION FILED MAY 15, 1916.
1,205,970.
Patented Nov. 28, 1916.
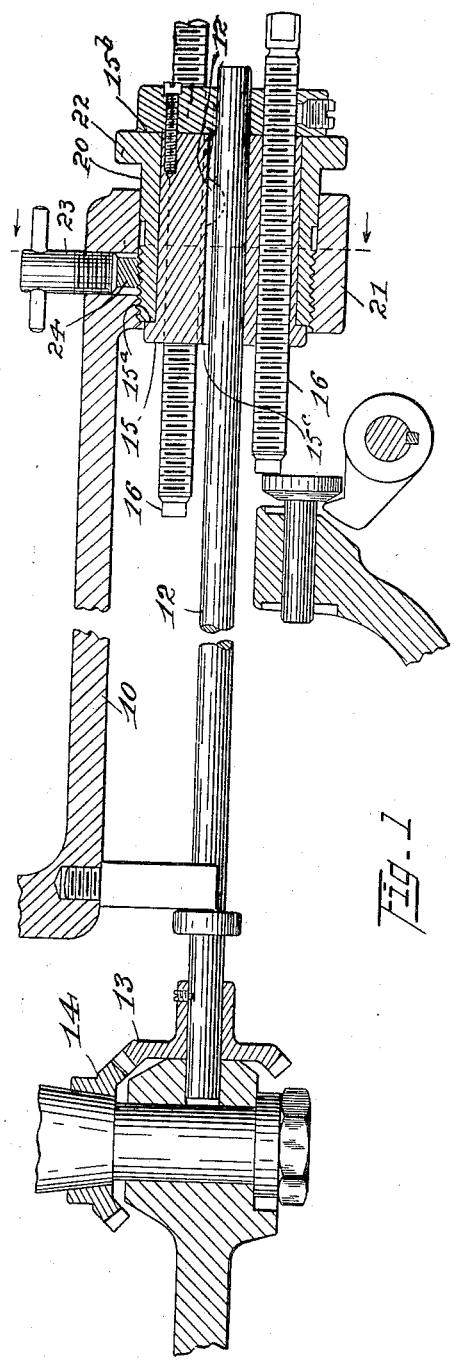
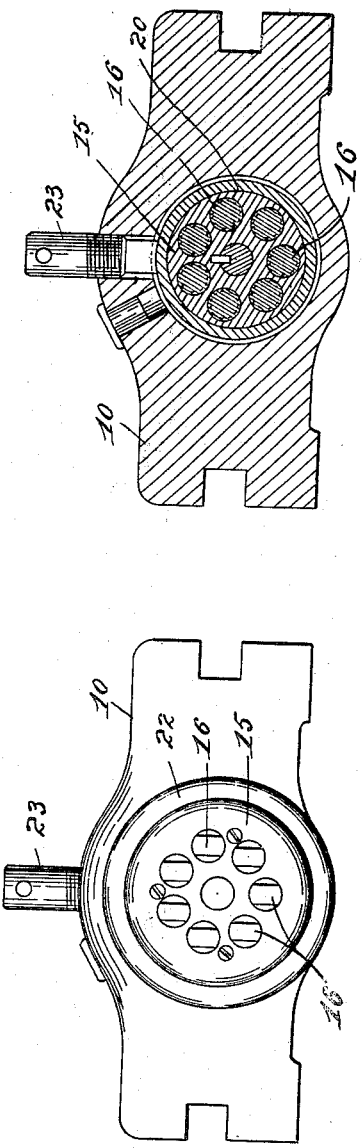
Inventor
Edward P. Burrell
by Thurston & Kwis
Attorneys

UNITED STATES PATENT OFFICE.

EDWARD P. BURRELL, OF CLEVELAND, OHIO, ASSIGNOR TO THE WARNER AND SWASEY COMPANY, OF CLEVELAND, OHIO, A CORPORATION OF OHIO.

AUTOMATIC STOP MECHANISM FOR TURRET-LATHES.

1,205,970.   Specification of Letters Patent.   Patented Nov. 28, 1916.

Application filed May 15, 1916. Serial No. 97,457.

*To all whom it may concern:*

Be it known that I, EDWARD P. BURRELL, a citizen of the United States, residing at Cleveland, in the county of Cuyahoga and State of Ohio, have invented a certain new and useful Improvement in Automatic Stop Mechanism for Turret-Lathes, of which the following is a full, clear, and exact description.

The object of this invention is to endow the automatic stop mechanism of a turret lathe with a capacity for simultaneous quick adjustment of all of the stop bars, whereby the machine will be better adapted to meet certain conditions which not infrequently arise in practice.

The invention is shown in the accompanying drawings, and is hereinafter described, both as to construction and mode of operation, and is definitely defined in the appended claims.

In the drawings, Figure 1 is a sectional front elevation of the said automatic stop mechanism together with so much of the turret lathe as is necessary to disclose the invention. Fig. 2 is a rear end view of the turret slide. Fig. 3 is a transverse vertical section in the plane of the second line shown on Fig. 1.

Referring to the parts by reference characters, 10 represents the turret slide; 12 represents the automatic stop shaft which is carried by the slide and extends in a direction parallel with the path in which the slide moves. At what may be termed the front end of this stop shaft it is provided with a bevel gear 13 that meshes with a bevel gear 14 fixed to the turret, in order that, as the turret turns, this shaft shall likewise turn and through a corresponding arc. This is common construction for mechanism of this sort. It is also common to provide a stop roll 15 which embraces the stop shaft 12 and has a driving connection therewith; and this stop roll carries as many adjustable stop rods 16 as there are faces to the turret. Commonly these stop rods are threaded and screwed through longitudinally threaded holes in the stop roll and therefore may be independently adjusted to project a desired distance forward from said stop roll.

When the turret turns to bring a given turret face into working position the stop shaft will likewise turn and bring the corresponding stop rod 16 into working position; that is to say, commonly into the lowest position it can occupy. When in this position it will, when the turret slides move forward a suitable distance, engage suitable knock out mechanism, with the result of disconnecting the turret slide from the mechanism for sliding it. The foregoing is a general statement of the commonly used automatic stop mechanism of turret lathes.

20 represents the stop roll adjustment sleeve. This is rotatably fitted upon and around the stop roll, in engagement with two shoulders 15ᵃ, 15ᵇ, thereon, so that said adjustment sleeve may turn relative to the stop roll, but will necessarily move the stop roll with it when it moves endwise. This sleeve 20 is exteriorly screw threaded and screws into a bracket 21 on the turret slide. When therefore one desires to move the stop roll endwise relative to the turret slide he has merely to turn this sleeve 20, which is provided with a flange 22 to facilitate its turning, and thereby the desired result will be attained. When the said adjustment sleeve has been turned sufficiently to bring the stop roll into the desired position, it may be locked in that position by means of a set screw 23 which screws down through the turret slide against a binder block 24 which has a threaded lower face for engagement with the threaded part of the adjustment sleeve. The rotation of this adjustment sleeve will move the stop roll in a direction parallel with the stop shaft; but said shaft carries a key or tongue 12ᵃ which projects into a longitudinal groove 15ᶜ in the stop roll. This permits the relative endwise movement of the stop roll relative to the stop shaft but preserves the driving connection between them.

The desirability of the above construction grows out of the fact that frequently a turret lathe is set for operation upon a large number of similar pieces of work; but these pieces of work frequently vary considerably in thickness, which makes it impossible for them to be put into the embrace of the machine chuck and have their rear ends, at that time, in precisely the same relation to the turret and the positions in which it will be stopped automatically by the stop mechanism. It has been customary in doing this kind of work on a turret lathe to roughly sort out the parts in accordance with their thickness, and to set the stop rods in suitable position for working on one group of these sorted work pieces. When these are finished, and preparatory to beginning to operate on another group of these work pieces, the stop rods are again adjusted in a position suitable for this work. With the construction hereinbefore described, however, the stop rods 16 are adjusted once in proper position relative to one another and to what may perhaps be the average thickness of the work pieces. Then as the workman puts into the machine a work piece of greater or less thickness than the average, he can, by merely turning the adjustment sleeve 20, very quickly move the stop roll into such position that all of the stop rods will be in the positions required for that particular piece of work.

Having described my invention, I claim:

1. In stop mechanism for turret lathes, the combination of a turret slide, a stop roll which is rotatably mounted upon said turret slide, a plurality of stops adjustably supported by said stop roll, means to adjust said stop roll lengthwise with respect to said turret slide and to hold it in any adjusted position, a turret rotatably mounted upon said turret slide, and means to transmit rotary motion from said turret to said stop roll.

2. In stop mechanism for turret lathes, the combination of a turret slide, a stop roll which is rotatably mounted upon said turret slide, a plurality of stops adjustably supported by said stop roll, means to adjust said stop roll lengthwise with respect to said turret slide and to hold it in any adjusted position, and a rotatable stop shaft which is concentric with said stop roll and has a tongue and groove driving connection therewith.

3. In stop mechanism for turret lathes, the combination of a turret slide, the stop shaft rotatably mounted thereon, the stop roll which embraces and has a tongue and groove connection with said shaft, a sleeve which is rotatably mounted upon said roll and lies between and in engagement with two annular shoulders thereon and is screwed into a part of the turret slide.

4. In stop mechanism for turret lathes, the combination of a turret slide, the stop shaft rotatably mounted thereon, the stop roll which embraces and has a tongue and groove connection with said shaft, a sleeve which is rotatably mounted upon said roll and lies between and in engagement with two annular shoulders thereon and is screwed into a part of the turret slide, and means to lock this adjustment sleeve against movement relative to said turret slide.

In testimony whereof, I hereunto affix my signature in the presence of two witnesses.

EDWARD P. BURRELL.

Witnesses:
H. Z. STAUFFER,
CHAS. J. STILWELL.